(12) United States Patent
Fraden

(10) Patent No.: US 6,447,160 B1
(45) Date of Patent: Sep. 10, 2002

(54) BLACKBODY CAVITY FOR CALIBRATION OF INFRARED THERMOMETERS

(75) Inventor: Jacob Fraden, La Jolla, CA (US)

(73) Assignee: Advanced Monitors Corp., San Diego, CA (US)

(*) Notice: Subject to any disclaimer, the term of this patent is extended or adjusted under 35 U.S.C. 154(b) by 0 days.

(21) Appl. No.: 09/982,594

(22) Filed: Oct. 17, 2001

Related U.S. Application Data

(63) Continuation of application No. 09/432,861, filed on Nov. 2, 1999.

(51) Int. Cl.[7] .................................................. G01K 15/00
(52) U.S. Cl. .............................. 374/2; 374/126; 374/3; 250/252.1 A
(58) Field of Search ................................ 374/2, 126, 3; 250/252.1 A; 219/405; 392/422, 438

(56) References Cited

U.S. PATENT DOCUMENTS

| | | | | |
|---|---|---|---|---|
| 2,952,762 | A | 9/1960 | Williams et al. ............ 250/352 |
| 3,138,697 | A | 6/1964 | Banca et al. ................ 382/407 |
| 3,348,408 | A | 10/1967 | Engborg ......................... 374/2 |
| 3,631,708 | A | 1/1972 | Ensor ............................. 374/2 |
| 3,699,343 | A | 10/1972 | Stein et al. ............... 250/493.1 |
| 4,317,042 | A | 2/1982 | Bartell .................... 250/493.1 |
| 4,379,775 | A | 4/1983 | Brandstetr et al. ............ 374/33 |
| 4,885,463 | A | 12/1989 | Wellman et al. ...... 250/252.1 A |
| 5,183,337 | A | 2/1993 | Pompei .......................... 374/2 |
| 5,716,133 | A | 2/1998 | Hosokawa et al. ......... 374/121 |
| 5,988,874 | A | 11/1999 | Rohner .......................... 374/2 |

FOREIGN PATENT DOCUMENTS

| | | |
|---|---|---|
| JP | 54084779 | 7/1979 |
| JP | 57131027 | 8/1982 |
| JP | 60250223 | 12/1985 |

OTHER PUBLICATIONS

J. Fraden, *Handbook of Modern Sensors: Physics Designs, and Applications*, Second Edition, pp. 112–114, American Institute of Physics, AIP Press, Woodbury, New York (1997).

*Primary Examiner*—Diego Gutierrez
*Assistant Examiner*—Lydia M. De Jesús
(74) *Attorney, Agent, or Firm*—Wood, Herron & Evans, L.L.P.

(57) ABSTRACT

A blackbody cavity having two types of wall surfaces wherein a first type has high emissivity and a second type has low emissivity. The low emissivity wall surface has an aperture from where the infrared radiation escapes the cavity, and is preferably shaped to minimize the escape through the aperture of radiation emanated directly from the low emissivity wall itself. The combination of high and low emissivity wall surfaces allows the blackbody to reduce the influence of the environmental temperature while maintaining emissivity approaching unity.

26 Claims, 1 Drawing Sheet

BLACKBODY CAVITY FOR CALIBRATION OF INFRARED THERMOMETERS

This application is a continuation of application Ser No. 09/432,861 filed on Nov. 2, 1999 (pending), the disclosure of which is hereby fully incorporated by reference herein.

1. Field of the Invention

The present invention relates generally to test equipment for measuring electromagnetic emission in mid- and far-infrared spectral ranges and relates more specifically to a blackbody cavity for calibration of infrared thermometers.

2. Description of Prior Art

Temperature of an object can be measured by means of thermal radiation when naturally emanated electromagnetic (thermal) radiation in the mid- and far-infrared (IR) spectral ranges is detected by an appropriate sensor. The IR sensor output signal is indicative of the surface temperature of an object. A sensor is an integral part of a measurement and/or data acquisition system. As a rule, a sensor is combined with some kind of an optical system which may include refractive and reflective components, such as lenses, mirrors, wave guides, windows, among others. A combination of optical components, an infrared sensor, and signal conditioning electronic circuits produces a useful signal which corresponds to the surface temperature of an object of measurement. Before the signal can be converted into any meaningful temperature number, its relationship with the IR radiation magnitude must be established with high accuracy. A standard way to find such a relationship is to calibrate an IR thermometer by exposing it to a well defined IR radiation source. To provide such a radiation source, a calibrating device known as a "blackbody" is routinely used by IR thermometer manufacturers.

In general, a blackbody is characterized by two fundamentally essential traits: temperature and emissivity. Temperature must be known with a required uncertainty, while emissivity must be as close to the value of unity as possible. Unity is a theoretical limit which describes an ideal blackbody. When a blackbody is designed, a prime goal is to approach the unity emissivity as close as practically possible. For example, a value near 0.999 would be considered well acceptable for calibrating most modern infrared thermometers.

As a rule, metals are poor emitters of IR radiation, that is, their emissivities are well below unity. A majority of non-metallic surfaces have relatively high emissivities. For example, organic paint, regardless of its color visible to a human eye, in mid- and far-infrared spectral ranges has emissivity of about 0.95. This is not nearly enough to consider a painted surface as a blackbody. In physics, there is a well established method to artificially increase the emissivity of a material. It is based on the so called "cavity effect." The effect is described, for example, in J. Fraden, "Handbook of Modem Sensors," American Institute of Physics, pp. 112–114 (1997), and is used by all producers of blackbodies. When IR radiation is emanated not from a flat surface but rather escapes from a small opening (aperture) in a cavity of a uniform wall temperature, the effective emissivity at the aperture becomes much higher then that of the internal cavity walls. This is due to the multiple internal reflections of IR radiation inside the cavity. Frequently, a blackbody cavity is made of metal having high thermal conductivity with a non-metallic coating on its internal cavity. A typical cavity blackbody has emissivity in the range from 0.980 to 0.990 which often is still not close enough to an acceptable level of 0.999.

A challenge to a blackbody designer is to provide a cavity having uniform wall temperatures with as many internal reflections as possible. This is often accomplished by making a cavity in a shape of a cone and immersing it into fluid, like water, of known temperature. (See, for example, U.S. Pat. No. 5,183,337, issued to Pompei.) To increase the number of internal reflections, a ratio of a cavity wall surface to the aperture shall be maximized. In many instances, this is not easy to accomplish, because any increase in cavity dimensions makes it much more difficult to assure the uniform wall temperatures, which for high precision blackbodies should not vary by more than 0.02° C. over the entire cavity surface. The most troublesome portion in the cavity is it's front end where the IR thermometer is inserted in the aperture. Dimensions of the front end should allow placement of the thermometer probe into the cavity opening, which may affect cavity wall temperatures near the opening and subsequently degrade the effective emissivity.

Thus, a primary purpose of the present invention to provide a blackbody having emissivity approaching unity. A further object is to provide a blackbody cavity which is less influenced by variations in environmental temperature. It is another object of the invention to provide a blackbody cavity having smaller dimensions. And it is a further object to provide a blackbody cavity which is easy to manufacture and maintain. Naturally, not every embodiment of the present invention will achieve all of these objects and advantages.

SUMMARY OF THE INVENTION

A blackbody cavity is disclosed having two types of wall surfaces wherein a first type has high emissivity and a second type has low emissivity. The low emissivity wall surface has an aperture from where the infrared radiation escapes the cavity, and is preferably shaped to minimize the escape through the aperture of radiation emanated directly from the low emissivity wall itself. The combination of high and low emissivity wall surfaces allows the blackbody to reduce the influence of the environmental temperature while maintaining emissivity approaching unity.

BRIEF DESCRIPTION OF THE DRAWING

The above and other objects and advantages of the present invention will be more readily appreciated from the following detailed description, when read in conjunction with the accompanying drawing, wherein.

DETAILED DESCRIPTION OF PREFERRED EMBODIMENT

Figure 1:
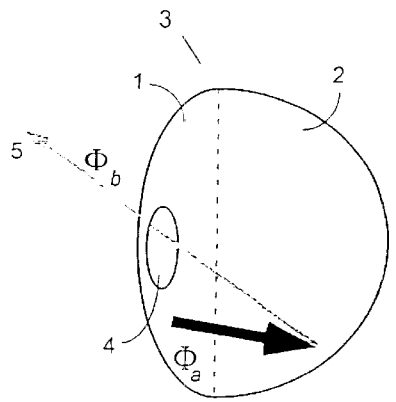
FIG. 1 is a generalized representation of a two-surface blackbody cavity according to the present invention.

Any surface is an emitter of thermal radiation. The properties of a surface are a key factor in determining how well the surface can emit such radiation. According to Kirchhoff's Law, a good emitter must be a poor reflector and vice versa:

$$\epsilon + \rho = 1 \qquad (1)$$

where $\epsilon$ is emissivity and $\rho$ is reflectivity of an object. Both factors vary on a scale from 0 to 1, with one factor changing at the expense of the other. Thus, a mirror is very poor emitter and a black surface is a very good emitter. FIG. 1 is a generalized or schematic representation of a two-surface blackbody cavity according to the present invention. The blackbody is an enclosure 3 consisting of two types of the inner surfaces, which may be termed first surface 1 and second surface 2. It should be understood that the type of the outside surface of enclosure 3 has no effect whatsoever on it's performance as a blackbody. The best performance, by definition, is when a blackbody doesn't reflect anything ($\rho=0$) and emits everything ($\epsilon=1$). Also by definition, inner surface temperature of entire enclosure 3 shall be the same everywhere so that the Stefan-Boltzmann law could be applicable:

$$\phi = \epsilon T^4 \quad (2)$$

where $\phi$ is the emitted IR flux and T is wall temperature in Kelvin. If the inner surface temperature is not the same in some spots, flux cannot be accurately related to temperature.

First surface 1 has an opening 4 through which IR radiation can escape to be measured. It is assumed that no radiation which emanates from first surface 1 can directly escape through opening 4, at least not without first being reflected from second surface 2. In other words, an IR thermometer probe inserted into opening 4 will not have first surface 1 within it's field of view.

To minimize the influence of first surface 1 temperature on a total flux emanated from the blackbody through its opening, the internal emission from first surface 1, according to Eq. 2, has a low emissivity. Then its emitted flux, $\phi_a$, after the internal reflection, will escape as flux, $\phi_b$, identified as IR radiation 5. With first surface 1 made highly reflective (low emissivity), any spurious escaping IR radiation 5 can be substantially minimized and thus the temperature of first surface 1 becomes of a lesser concern for the designer. Another benefit of the low emissivity of first surface 1 is that it reflects back a majority of IR radiation from second surface 2, thus nearly doubling the effective size of enclosure 3.

Figure 2:
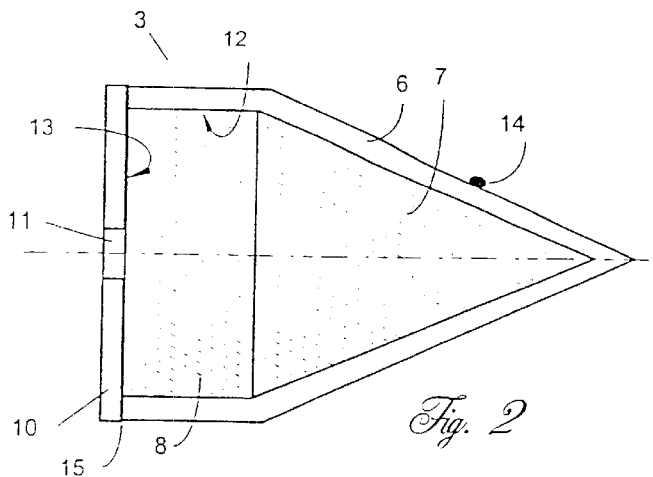
FIG. 2 is a sectional view of a practical embodiment of a blackbody cavity with an aperture according to the present invention.

As an example of a preferred embodiment, FIG. 2 shows a practical blackbody enclosure 3 made of metal with high thermal conductivity (like copper or aluminum). It is fabricated as a body of rotation with a cylindrical portion 8 and conical portion 7, wherein the entire inner surface 12 of both portions 7 and 8 are coated with high emissivity layer, for example, with organic paint having IR emissivity in the 0.95 range. The thickness of wall 6 shall be sufficient to assure nearly equal temperatures of both portions 7 and 8. In practice, the wall thickness is determined by other design features as will be noted below. The wall temperature is monitored by temperature sensor 14 which is thermally coupled to wall 6. The open side of cylindrical portion 8 is closed with plate 10 having aperture 11 for insertion of an IR thermometer (not shown). Inner surface 13 of plate 10 is made highly reflective in the wavelength of interest. Specifically, for mid- and far-infrared spectral ranges, preferably inner surface 13 should be polished and coated with gold. Other metals may be used with a somewhat lesser efficiency. Seam 15 between plate 10 and cylindrical portion 8 should be a thermal joint. Since plate 10 preferably is made of metal, the joint can be a weld, a press fit, mating threads, among others. Because plate 10 is reflective, its temperature influence is dramatically minimized and thus it can be made relatively thin which simplifies insertion of an IR thermometer through aperture 11. In most practical cases, plate 10 can have thickness between 1 and 5 mm.

Figure 3:
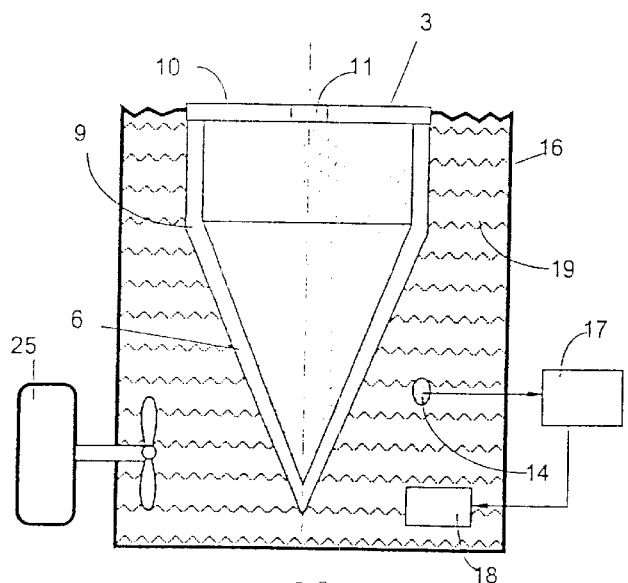
FIG. 3 shows the blackbody cavity of FIG. 2 immersed in fluid.

FIG. 3 illustrates a practical blackbody cavity 9 immersed in tank 16 filled with a fluid 19, such as water. The water is constantly stirred by a conventional agitator mechanism 25. In this embodiment, wall 6 may have a thickness ranging from 2 to 10 mm. Water temperature is monitored by sensor 14 whose output signal is fed into control system 17 which controls heater/cooler 18. Water temperature can be set at any practical level and, because of constant or at least frequent stirring, is quite uniform all around cavity 9. Substantially uniform temperature is essential for normal operation. The only exception is for plate 10, which is positioned close to the water surface and is more influenced by ambient air temperature. As a result, there is a greater uncertainty in plate 10 temperature. Yet, thanks to it's high reflectivity, plate 10 has little effect on the total IR flux escaping through aperture 11.

Figure 4:
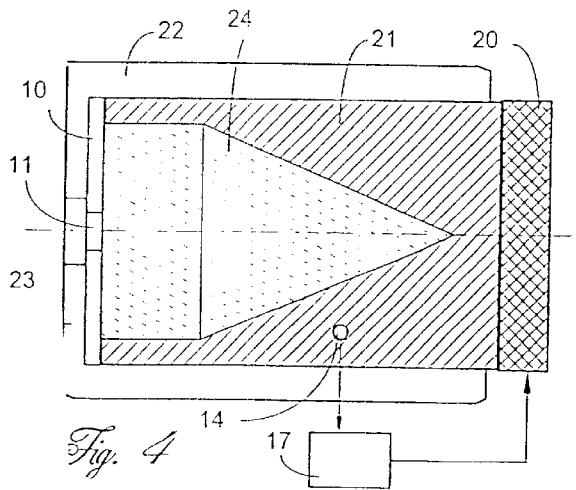
FIG. 4. shows the blackbody cavity shape of FIG. 2 formed in solid material.

Another practical design is shown in FIG. 4. In this case, temperature of the blackbody is controlled by a sold-state media. Cavity 24 is fabricated inside of massive metal body 21. Again, the metal should have high degree of thermal conductivity. Copper and aluminum are preferable. As in the above described examples, the inner surface of cavity 24 is coated with a high emissivity layer, and front plate 10 has a reflective surface facing the cavity. The exterior of body 21 is encapsulated within thermal insulating jacket 22 to reduce heat flow to the surroundings. The jacket can be made of one or more layers of closed cell urethane foam, for example. The back side of the cavity is provided with a heating/cooling device 20. This device may be of any conventional design, for example, thermoelectric, air blower, or water circulating type, among others. The temperature of body 21 is monitored by imbedded sensor 14 whose output is fed into a control system 17 which utilizes device 20 to generate or liberate heat. In this design, body 21 should have sufficient thickness of metal between the surroundings and cavity 24. Practically, the metal thickness around cavity 24 should vary from 5 to 20 mm. Thermal insulating jacket 22 should have thickness of at least 10 mm, yet near plate 10, the front 23 of the insulating jacket may have reduced thickness which in practice may range from 1 to 5 mm. This simplifies the access of an IR thermometer into cavity 24 via aperture 11.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A blackbody enclosure comprising:
    a body having an interior and an exterior, and an aperture through which radiation can escape from the interior, the body having a total interior surface area defined by a first surface area and a second surface area,
    the first surface area having a first emissivity,
    the second surface area having a second emissivity which is higher than said first emissivity, and
    wherein no radiation which emanates from the first surface area can directly escape through the aperture without first reflecting off of the second surface area.

2. The blackbody enclosure of claim 1, wherein the first surface has a substantially flat profile.

3. The blackbody enclosure of claim 1, wherein the second surface forms a body of rotation.

4. The blackbody cavity of claim 1, further comprising a temperature sensor thermally coupled to the body.

5. The blackbody enclosure of claim 1, wherein the first surface is polished and coated with gold.

6. A blackbody enclosure comprising:
    a body having an interior and an exterior, and an aperture through which radiation can escape from the interior, the body having a total interior surface area defined only by a first surface area and a second surface area, the first surface area having a first emissivity, the second surface area having a second emissivity which is higher than said first emissivity, wherein the first surface area is shaped and configured relative to the aperture such that no portion thereof is within the field of view of a probe inserted into the aperture.

7. The blackbody enclosure of claim 6, wherein the first surface has a substantially flat profile.

8. The blackbody enclosure of claim 6, wherein the second surface forms a body of rotation.

9. The blackbody cavity of claim 6, further comprising a temperature sensor thermally coupled to the body.

10. The blackbody enclosure of claim 6, wherein the first surface is polished and coated with gold.

11. A blackbody calibration system comprising:

a body having an interior and an exterior, and an aperture through which radiation can escape from the interior, the body having a total interior surface area defined by a first surface area and a second surface area, the first surface area having a first emissivity, the second surface area having a second emissivity which is higher than said first emissivity, wherein no radiation which emanates from the first surface area can directly escape through the aperture without first reflecting off of the second surface area, and tank containing a fluid in which the body is immersed for providing a substantially uniform constant temperature of the body.

12. The blackbody calibration system of claim 11, wherein the first surface has a substantially flat profile.

13. The blackbody calibration system of claim 11, wherein the second surface forms a body of rotation.

14. The blackbody calibration system of claim 11, further comprising a temperature sensor thermally coupled to the body.

15. The blackbody calibration system of claim 11, wherein the first surface is polished and coated with gold.

16. The blackbody calibration system according to claim 11, further comprising:

a temperature control element for adding heat to or removing heat from the fluid;

a temperature sensor for monitoring the fluid; and an agitator for stirring the fluid; and whereby a substantially uniform constant temperature of the fluid is maintained.

17. The blackbody calibration system according to claim 16, further comprising a control system connected to each of the temperature control element and the temperature sensor for automatically maintaining a substantially uniform constant temperature of the fluid.

18. A blackbody calibration system comprising:

a body having an interior and an exterior, and an aperture through which radiation can escape from the interior, the body having a total interior surface area defined only by a first surface area and a second surface area, the first surface area having a first emissivity, the second surface area having a second emissivity which is higher than said first emissivity, wherein the first surface area is shaped and configured relative to the aperture such that no portion thereof is within the field of view of a probe inserted into the aperture, and a tank containing a fluid in which the body is immersed for providing a substantially uniform constant temperature of the body.

19. The blackbody calibration system of claim 18, wherein the first surface has a substantially flat profile.

20. The blackbody calibration system of claim 18, wherein the second surface forms a body of rotation.

21. The blackbody calibration system of claim 18, further comprising a temperature sensor thermally coupled to the body.

22. The blackbody calibration system of claim 18, wherein the first surface is polished and coated with gold.

23. The blackbody calibration system according to claim 18, further comprising:

a temperature control element for adding heat to or removing heat from the fluid;

a temperature sensor for monitoring the fluid; and an agitator for stirring the fluid; and whereby a substantially uniform constant temperature of the fluid is maintained.

24. The blackbody calibration system according to claim 23, further comprising a control system connected to each of the temperature control element and the temperature sensor for automatically maintaining a substantially uniform constant temperature of the fluid.

25. A blackbody calibration system comprising:

a body having an interior and an exterior, and an aperture through which radiation can escape from the interior, the body having a total interior surface area defined by a first surface area and a second surface area, the first surface area having a first emissivity, the second surface area having a second emissivity which is higher than said first emissivity, wherein no radiation which emanates from the first surface area can directly escape through the aperture without first reflecting off of the second surface area, and a temperature control device for adding heat to or removing heat from the body.

26. A blackbody calibration system comprising:

a body having an interior and an exterior, and an aperture through which radiation can escape from the interior, the body having a total interior surface area defined only by a first surface area and a second surface area, the first surface area having a first emissivity, the second surface area having a second emissivity which is higher than said first emissivity, wherein the first surface area is shaped and configured relative to the aperture such that no portion thereof is within the field of view of a probe inserted into the aperture, and a temperature control device for adding heat to or removing heat from the body.

* * * * *